United States Patent [19]

Toyama et al.

[11] Patent Number: 4,646,109
[45] Date of Patent: Feb. 24, 1987

[54] AUTOMATIC DRAFTING MACHINE HAVING AIR BLOWER MEANS FOR HOLDING PAPER DOWN

[75] Inventors: Akio Toyama; Shuso Matsumoto; Kazunori Tada, all of Tokyo, Japan

[73] Assignee: Mutoh Industry Ltd., Tokyo, Japan

[21] Appl. No.: 741,891

[22] Filed: Jun. 6, 1985

[30] Foreign Application Priority Data

Jun. 27, 1984 [JP] Japan .............................. 59-96391[U]

[51] Int. Cl.$^4$ ...................... G01D 15/24; B65H 29/24; B65H 20/00
[52] U.S. Cl. .................... 346/134; 271/194; 226/95
[58] Field of Search ........................ 346/134, 140 PD; 271/194, 195, 196, 90, 92, 102, 20; 226/95; 400/613.3

[56] References Cited

U.S. PATENT DOCUMENTS

| Re. 31,684 | 9/1984 | Yeiser | 346/134 |
| 3,224,761 | 12/1965 | Meyer-Jagenberg | 271/195 |
| 3,276,425 | 10/1966 | Rabb | 271/195 |

*Primary Examiner*—E. A. Goldberg
*Assistant Examiner*—Mark Reinhart
*Attorney, Agent, or Firm*—Wenderoth, Lind & Ponack

[57] ABSTRACT

An automatic drafting machine in which the paper is disposed on drive rollers and the paper is sandwiched by the drive rollers and pressure rollers in resilient contact with the drive rollers, and a writing implement is shiftably disposed in a right angle direction to the feeding direction of the paper along the horizontal surface of the paper, and guides for mounting the paper are disposed on both sides of the track along which the writing implement shifts, and an air blowing opening for supplying downward air pressure on the paper is disposed in the vicinity of the outer end portions of the guides in the feeding direction of the paper.

5 Claims, 3 Drawing Figures

U.S. Patent   Feb. 24, 1987   4,646,109
FIG. 1
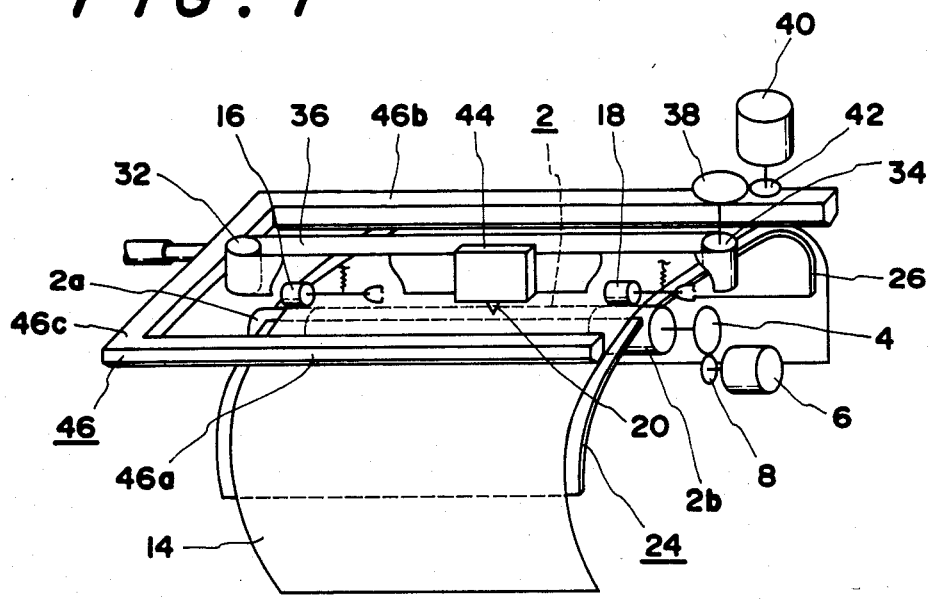
FIG. 2
FIG. 3
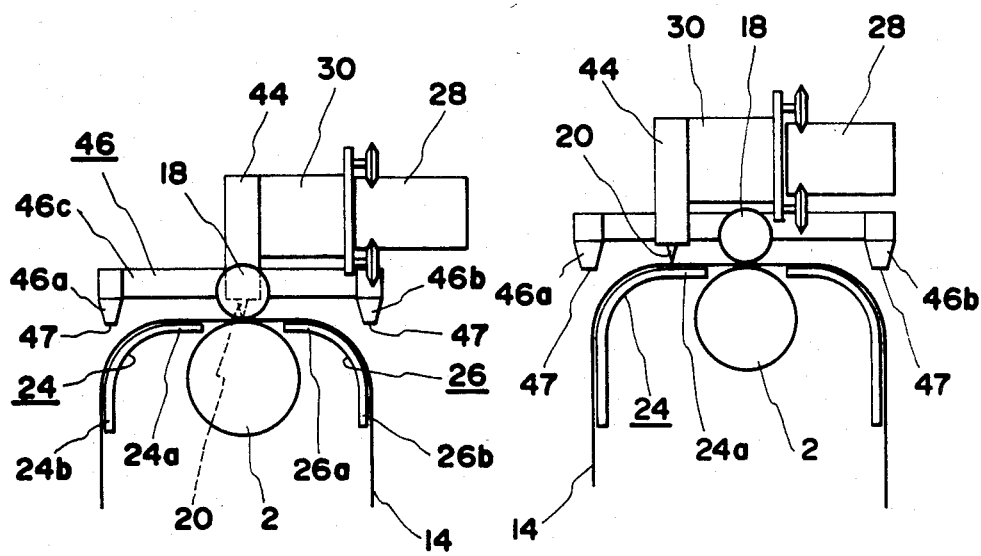

1

AUTOMATIC DRAFTING MACHINE HAVING AIR BLOWER MEANS FOR HOLDING PAPER DOWN

BACKGROUND OF THE INVENTION

This invention relates to pinch roller type automatic drafting machines for applying pressure to paper by drive rollers and pressure rollers to feed the paper in a predetermined direction.

The automatic drafting machines of this kind function in such a way that paper is sandwiched by the pressure of drive rollers and pressure rollers to feed the paper in a Y-coordinate axial direction, and a drawing head is shifted along the paper in an X-coordinate axial direction and a pen of the drawing head is made to contact and to separate from the paper to draw a predetermined pattern on the paper automatically.

The horizontal surfaces of guides for supporting and guiding the paper of the automatic drawing machine are set so that the length is set short in the Y-coordinate axial direction in order to save the entire space of the automatic drafting machine. For this reason, the front and back of the paper are arranged not to be supported by the guides. In this construction, when the paper is fed at a high speed in forward and reverse directions along the X-coordinate axis by a pinch roller mechanism, the free ends of the front and rear of the paper in the feeding direction float in the horizontal direction instead of the free ends hanging down, and thus, the front and rear of the paper collide with objects positioned at the front and rear of the machine or the drawing paper is torn by the wind pressure working on the drawing paper, and the torn portion enters the rollers of the pinch roller mechanism causing trouble in the drawing operation which is a problem. An object of this invention is to eliminate the foregoing problem.

SUMMARY OF THE INVENTION

In order to achieve the foregoing object, this invention provides a pinch roller type automatic drafting machine in which paper is disposed on the drive rollers connected to a drive system and the paper is sandwiched by the drive rollers and pressure rollers in a resilient contact with the drive rollers, and a drawing head is shiftably disposed for movement in a right angle direction to the feeding direction to the paper along the horizontal surface of the paper, and guides are disposed at both sides of the shifting track of the drawing head to support the paper, and an air blowing opening is provided for directing air pressure in a downward direction on the paper in the vicinity of the outer end portions of the guides extending in the paper feeding direction.

In this construction, the portions away from the horizontal surface of the guides for supporting the paper are controlled in a direction where the paper hangs down by the air pressure from the air blowing opening. Accordingly, even if the paper is made to move rapidly by the drive roller, there is no chance of the front and rear of the paper floating or tearing in the feeding direction of the paper.

DESCRIPTION OF THE FIGURES

FIG. 1 is an explanatory perspective view of the drawing machine according to the invention;

FIG. 2 is an explanatory side elevation view thereof; and

FIG. 3 is an explanatory side elevation view showing another embodiment of the machine according to the invention.

DESCRIPTION OF THE PREFERRED EMBODIMENT

The construction of this invention will be described in detail by referring to an embodiment illustrated in FIGS. 1 and 2 of the attached drawings.

Reference numeral 2 denotes a drum rotatably supported on a machine frame of a drawing machine (not shown), and an underlay surface is formed on its surface. At both end portions of the drum 2, drive rollers 2a and 2b are integrally formed. On the center axle of the drive roller 2b, a gear 4 is fixed, and the gear is meshed with a gear 8 fixed to an output shaft of an X motor 6 fixed to the machine frame. In FIG. 2, numeral 28 denotes a Y rail installed on the machine frame in parallel with the longitudinal direction of the drum 2, and a Y cursor 30 is shiftably connected to the Y rail by means of a roller. At both end portions of the Y rail 28, belt rollers 32 and 34 are rotatably supported, and an endless belt 36 is reeved around the belt rollers 32 and 34. The Y cursor 30 is connected to the belt 36. To the shaft fixed to the center of the belt roller 34, a gear 38 is fixed, and the gear 38 is meshed with a gear 42 fixed to an output shaft of a Y motor 40 fixed to the machine frame. A drawing head 44 is fixed to the Y cursor 30, and a writing implement 20 is connected to a drive device (not shown) for lifting the writing implement built in the head 44. The X, Y motors 6 and 40 and the writing implement lifting drive device are connected to a controller (not shown) controlled by a computer (not shown). Numerals 16 and 18 denote pressure rollers, which are mounted liftably on the machine frame, and the surfaces of the rollers are in resilient contacting condition on the surfaces of the drive rollers 2a and 2b by the resilient force of the springs. Numerals 24 and 26 denote guides for supporting paper and are fixed to the machine frame, and are disposed in the proximity of both sides of the drum 2. The guides 24 and 26 are constructed in such a way that the horizontal portions 24a and 26a are short so that the machine frame does not occupy a large space in the feeding direction of the paper, and the paper is guided in the downward direction by the downwardly depending portions 24b and 26b. Reference numeral 46 denotes an air blowing pipe having an overall ]-shape, and lateral pipe portions 46a and 46b of the air blowing pipe are positioned right above the vicinity of the outer end portions of the horizontal portions 24a and 26a of the guides 24 and 26. The lateral pipe portions 46a, and 46b having an air blowing opening 47 directed downwardly over almost the entire length thereof. A transverse pipe portion 46c of the air blowing pipe 46 is connected to an air blower (not shown) by means of a tube.

The operation of the embodiment will be described in the following. The paper 14 is mounted on the horizontal portions 24a and 26a of the guide plates 24 and 26, and the pressure rollers 16 and 18 are resiliently in contact with the drive rollers 2a and 2b from above both sides of the paper 14, and the paper 14 is sandwiched by the pressure rollers 16 and 18 and the drive rollers 2a and 2b. On the other hand, a power source switch of the blower is turned ON, and the blower is in a drive condition.

In the foregoing construction, when the X motor 6 is driven, the drive rollers 2a and 2b rotate in forward or reverse directions, and the paper 14 is shifted in a predetermined X direction by the pinch roller mechanism consisting of the drive rollers 2a, 2b and the pressure rollers 16 and 18. On the other hand, the drawing head 44 is shifted in the longitudinal direction of the underlay surface of the drum by the drive of the Y motor 40. The writing implement 20 is controlled to raise and lower it relative to the underlay surface and when the writing implement 20 is lowered, its tip is in resilient contact with the paper 14 on the underlay surface of the drum 2. In this condition, when the X and Y motors 6 and 40 are driven by the controller, and the paper 14 and the drawing head 44 are shifted in predetermined directions, a predetermined pattern is drawn on the paper 14 by the writing implement 20. When the paper 14 is shifted in right and left directions by the rotation of the drive rollers 2a and 2b in FIG. 2, in the forward and reverse directions, the paper 14 is urged against the depending portions 24b and 26b of the guides 24 and 26 by the pressure of the air from the air blowing opening 47 of the air blowing pipe 46, and the front and rear end portions of the paper 14 in the longitudinal direction do not float in the horizontal direction, and they are suspended by the air pressure and the paper 14 is shifted smoothly on the guides 24 and 26. Alternatively, as shown in FIG. 3, the air blowing pipe 46 may be provided in a pinch roller type automatic drawing machine which utilizes the horizontal portion 24a of the guide 24 as the underlay surface and and in which the tip of the writing implement 20 abuts the paper on the underlay surface.

The invention is constructed in such a way that the portion of the paper supported in the horizontal condition by the mounting guides is controlled in the suspending direction by the air pressure so that the floating of the front and rear end portions of the paper in the paper feeding direction can be prevented, and thus, the front and rear end portions of the paper are prevented from colliding with any object in the vicinity of the machine frame, and the paper does not float and is not torn by its rapid motion which are effects of this invention.

What is claimed is:

1. An automatic drafting machine comprising:
   paper supporting plate-shaped guide means extending in the direction of the path of paper through the machine and having a forward and rearward edge;
   drive rollers at at least one position along the opposite longitudinal edges of said guide means on which paper being guided along the guide means engages and means for driving said drive rollers;
   pinch rollers in resilient contact with said drive rollers for holding the paper against said drive rollers;
   a drawing head movable transversely to the direction of movement of said paper and having a writing implement thereon for engagement with the paper; and
   air blowing means adjacent the forward and rearward edges of said guide means for directing air downwardly against the paper being guided for holding the paper against the guide means at said forward and rearward edges.

2. An automatic drafting machine as claimed in claim 1 in which said guide means has downwardly curved depending portions at the forward and rearward edges, and said air blowing means is just forward of said forward edge and just rearward of said rearward edge, whereby the paper is held against the curved surface and the depending portions of said guide means for guiding it smoothly therealong.

3. An automatic drafting machine as claimed in claim 1 in which said guide means has a transversely extending gap in the middle thereof between said forward and rearward edges and further comprises a supporting roller in said gap having said driving rollers at the opposite ends thereof and exposed through said gap.

4. An automatic drafting machine as claimed in claim 3 in which said drawing head is movable above said gap and said writing instrument is supported by said supporting roller.

5. An automatic drafting machine as claimed in claim 3 in which said drawing head is movable above a horizontal portion of said guide means and said writing instrument is supported by said guide means.

* * * * *